United States Patent Office 3,804,882
Patented Apr. 16, 1974

3,804,882
INTERMEDIATES USEFUL IN THE SYNTHESIS
OF VITAMIN A
Marc Julia, Paris, France, assignor to
Rhone-Poulenc S.A., Paris, France
No Drawing. Original application Aug. 4, 1971, Ser. No. 169,114, now Patent No. 3,748,347, dated July 24, 1973. Divided and this application Dec. 29, 1972, Ser. No. 319,878
Claims priority, application France, Aug. 5, 1970, 18906
Int. Cl. C07c 149/40
U.S. Cl. 260—470      2 Claims

ABSTRACT OF THE DISCLOSURE

Sulphones of the formula:

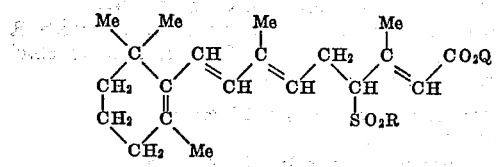

in which R is aryl and Q is hydrogen or a hydrocarbon radical, which are made by reacting, preferably at low temperature, a halide of the formula:

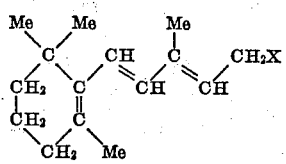

and a sulphone of the formula:

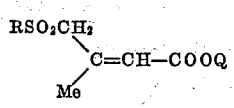

are useful intermediates for producing vitamin A into which they may be converted by saponification, desulphonation, and reduction.

---

This is a division of application Ser. No. 169,114, filed Aug. 4, 1971, now U.S. Pat. 3,748,347.

The present invention relates to intermediates useful in the synthesis of vitamin A.

The present invention provides, as new compounds useful as intermediates in the synthesis of vitamin A, the sulphones of the formula:

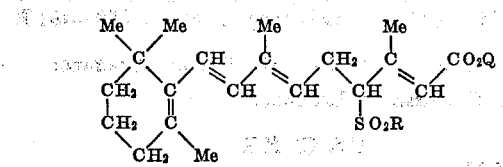

in whch X represents a chlorine, bromine or iodine atom, hydrogen atom or a monovalent hydrocarbon radical. R can in particular represent naphthyl, phenyl or alkylphenyl, in which the alkyl is preferably of 1 to 4 carbon atoms, such as p-toluyl. Q can be, for example, an alkyl, cycloalkyl, aryl or aralkyl radical, but is preferably an alkyl radical of 1 to 4 carbon atoms, such as methyl or ethyl.

The sulphones of Formula I are obtained in accordance with a feature of the invention by reaction of a halide of the formula:

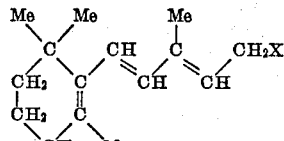

in which X represents a chlorine, bromine or iodine atom, with a sulphone of the formula:

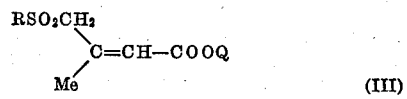

in which R and Q have the meanings given above. It is to be understood that the Formulae I and II do not necessarily represent sterically pure products, but can represent mixtures of cis and trans isomers.

The reaction of the halide of Formula II with the sulphone of Formula III is preferably carried out at between —40° and 0° C., and usually at between —35 and —25° C. It is advantageous to carry out the reaction in the presence of a solvent, especially an ether, such as tetrahydrofuran or dioxane, or another aprotic polar solvent, such as dimethylformamide, dimethylsulphoxide, hexamethylphosphorylamide or N-methylpyrrolidone. Generally, the process is carried out in the presence of an acceptor, e.g. an alkali metal butylate, for the hydrogen halide liberated. Usually, a solution of the halide of Formula II is slowly added to the mixture of the other constituents of the reaction mixture. After the reaction and after the usual preliminary purification treatments, the sulphone of Formula I may be isolated in the pure state, for example by chromatography.

The halide of Formula II may be obtained by halogenation of vinyl-β-ionol with a phosphorus trihalide.

The sulphones of Formula III which are new compounds, may be obtained by reaction of an alkali metal sulphinate of Formula RSO₂M, in which M represents an alkali metal, with a γ-halogenosenecioate of a nonvalent hydrocarbon radical, which is in turn obtainable by halogenation of the corresponding senecioate with an N-halogenosuccinimide, for example by bromination with N-bromosuccinimide.

Desulphonation of the sulphones of Formula I in which Q represents hydrogen, yields the acid of formula

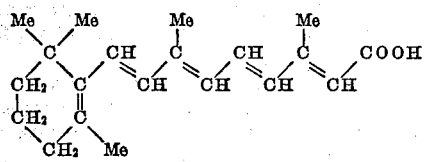

As is already known, reduction of the terminal carboxyl radical of this acid to give a hydroxymethyl radical —CH₂OH yields vatmin A. When Q is in the sulphone of Formula I is initially a hydrocarbon radical, the latter is first replaced by hydrogen by saponification.

The example which follows illustrates the invention.

EXAMPLE

Potassium t-butylate (6.9 g.) in tetrahydrofuran (40 cc.), followed by the sulphone (16.5 g.-0.06 mol) of formula:

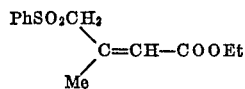

are introduced at 20° C., into a three-neck flask of 250 cc. capacity, equipped with a mechanical stirrer. A homogeneous blood-red solution (carbanion formation) is thus obtained.

The whole is cooled to −30° C. and a solution of 21.7 g. of a product containing 80% of the bromide of formula:

$$\text{(IV)}$$

Me—C(Me)—CH—C(Me)=CH—CH—CH$_2$Br, with ring CH$_2$—C—CH$_2$—C(=CH$_2$)—Me (vinyl-β-ionyl bromide structure)

in anhydrous tetrahydrofuran (25 cc.) is added dropwise at the same temperature.

After the addition, the temperature is allowed to rise to 20° C. again, stirring is continued for a further 6 hours at 20° C., and the mixture is left to stand for 15 hours. The greater part of the tetrahydrofuran is evaporated in vacuo and the reaction mixture is taken up in water. The neutral fraction and the acid fraction are separated in the usual manner. The neutral fraction (36.9 g.) is a red oil containing 37% of products of formula:

Me—C(Me)—CH—C(Me)=CH—CH(SO$_2$Ph)—C(Me)=CH—COOEt (with vinyl-β-ionyl ring)

This sulphone-ester (13.6 g.) is isolated by chromatography on a silica column.

The initial starting materials were synthesized as follows:

(a) The 80% pure bromide of Formula IV was obtained by bromination of vinyl-β-ionol with phosphorus tribromide.

Anhydrous diethyl ether (2.5 cc.), pyridine (0.05 cc.) and vinyl-β-ionol (2.2 g.–0.01 mol) of the formula:

Me—C(Me)—CH—C(Me)=CH—CH(OH)—CH=CH$_2$ (with vinyl-β-ionyl ring)

are introduced into a flask equipped with a stirrer. The whole is cooled to −35° C. with stirring and a mixture of anhydrous diethyl ether (1 cc.) and phosphorus tribromide (0.9 g.) is added dropwise with stirring. When the addition is complete, stirring is continued for a further 30 minutes at −35° C., and the temperature is then allowed to rise to 0° C., again and is kept at 0° C., for one hour, with continued stirring.

The ether phase is decanted, the residue is washed with diethyl ether, and the ether layers are combined and washed with an ice-cold solution of sodium bicarbonate. The aqueous layer is extracted with diethyl ether and the ether layer is rapidly washed with ice-cold water; the combined ether layers are dried over magnesium sulphate. After evaporation of the ether at 0° C., a crude bromide (2.17 g.), containing 80% of the bromide of Formula IV, is obtained. The yield of the bromide of Formula IV is thus 60% based on the vinyl-β-ionol introduced. This bromide is not stable in the pure state and at ambient temperature. It is desirable therefore to store it in solution in diethyl ether under nitrogen at a temperature below 0° C.

(b) Ethyl γ-(phenylsulphonyl)senecioate was prepared by reaction of sodium phenylsulphinate, PhSO$_2$Na, with ethyl γ-bromosenecioate.

Sodium phenylsulphinate (16.4 g., 0.1 mol) is dissolved in anhydrous methanol (35 cc.) in a three-neck flask equipped with a mechanical stirrer. Ethyl γ-bromosenecioate (20.7 g., 0.1 mol) is added dropwise at 20° C. A yellow precipitate appears. After completion of the addition, the mixture is stirred for a further 10 minutes. The methanol is distilled off and progressively replaced by an equal volume of water. After cooling, the aqueous phase is extracted with diethyl ether and the organic layers are combined. The whole is washed with water and then dried over magnesium sulphate. After evaporation of the solvent, ethyl γ-(phenylsulphonyl)senecioate (24.75 g.) (92% yield) is obtained as a practically colorless liquid.

Ethyl γ-bromosenecioate (mixture of cis and trans isomers) was prepared by bromination of ethyl senecioate with N-bromosuccinimide, in a yield of 67% based on the N-bromosuccinimide, by the method described by I. Ahmad et al. J. Chem. Soc. 1958 C 185 to 187.

The final sulphone-ester of Formula I, in which R represents a phenyl radical and Q represents an ethyl radical, can be used as follows:

10 g. of this sulphone-ester (0.021 mole)
20 cc. of 96% ethanol and
3.5 g. of potassium hydroxide (0.064 mole)

are kept at boiling temperature under reflux for two hours. After cooling the acid fraction (6.4 g.) is separated in the usual manner. By recrystallization of this acid fraction in petrol ether, 73 mg. of vitamine A acid of formula Me—C(Me)—CH—C(Me)=CH—CH=CH—C(Me)=CH—COOH (with vinyl-β-ionyl ring)

are obtained (M.P.: 177–179° C.) (12% yield).

I claim:

1. A sulphone of the formula:

$$\text{RSO}_2\text{CH}_2\diagdown\text{C}=\text{CH}-\text{COOQ}\diagup\text{Me}$$

in which R represents an aryl radical and Q represents hydrogen or alkyl of 1 to 4 carbon atoms, and Me is methyl.

2. A sulphone according to claim 1 in which R represents phenyl and Q represents ethyl.

References Cited
UNITED STATES PATENTS

| | | | |
|---|---|---|---|
| 3,437,685 | 4/1969 | Brust | 260—481 |
| 3,655,772 | 4/1972 | Chang, et al. | 260—607 A |
| 3,726,884 | 4/1973 | Aichenegg, et al. | 260—481 R |

LORRAINE A. WEINBERGER, Primary Examiner

P. J. KILLOS, Assistant Examiner

U.S. Cl. X.R.

260—515 M.

UNITED STATES PATENT OFFICE
CERTIFICATE OF CORRECTION

Patent No. 3,804,882  Dated April 16, 1974

Inventor(s) Marc JULIA

It is certified that error appears in the above-identified patent and that said Letters Patent are hereby corrected as shown below:

In the Claim for Convention Priority appearing in the heading of the patent, for "18906" as the French application number, read -- 28906 --

Signed and sealed this 19th day of November 1974.

(SEAL)
Attest:

McCOY M. GIBSON JR.
Attesting Officer

C. MARSHALL DANN
Commissioner of Patents